Nov. 20, 1962 W. F. RIGGS 3,064,623
STARTING GATE HORSE CONTROL
Filed Sept. 6, 1960
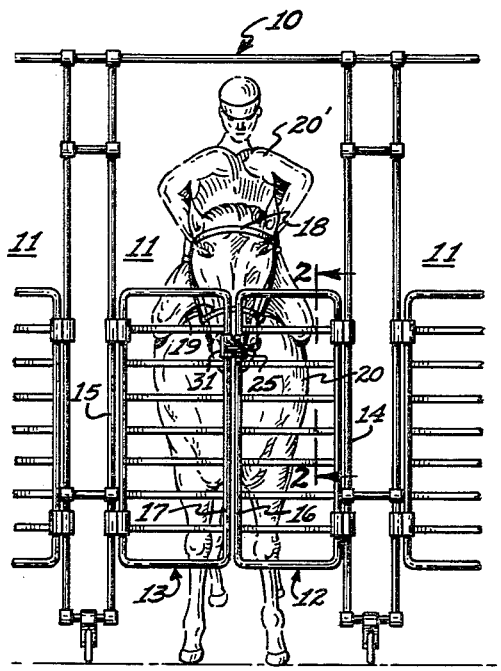
Fig. 1
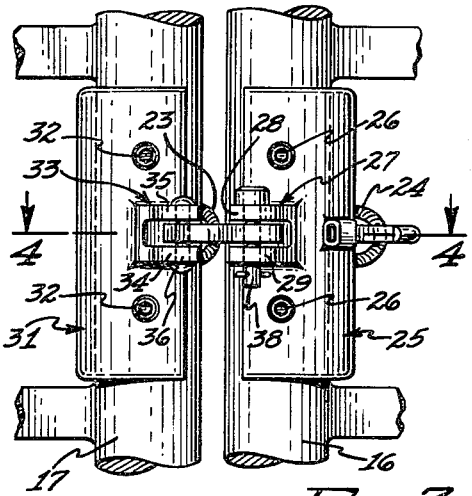
Fig. 3
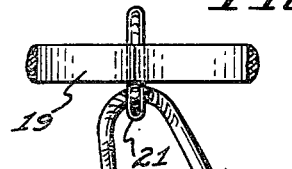
Fig. 4
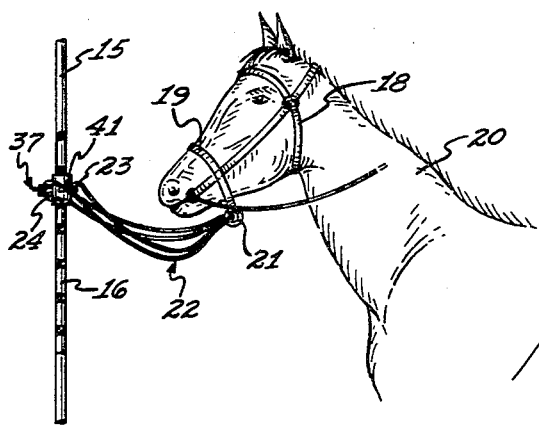
Fig. 2
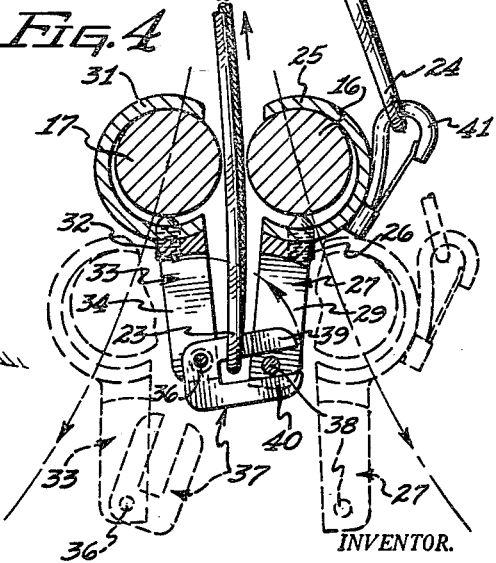
INVENTOR.
WILLIAM F. RIGGS.
BY
ATTORNEY.

United States Patent Office 3,064,623
Patented Nov. 20, 1962

3,064,623
STARTING GATE HORSE CONTROL
William F. Riggs, Conway Springs, Kans.
Filed Sept. 6, 1960, Ser. No. 54,130
5 Claims. (Cl. 119—15.5)

The present invention relates to starting gates as employed in horse racing. As is well known, the starting gates provided for lining up the contestants, include a plurality of stalls each of which has a pair of gates which are automatically opened upon a given signal. The horses remain in the stalls with the riders ready to start the race upon the simultaneous opening of the gates.

In practice it is necessary for the horses with the riders thereon to remain inactive for a time period awaiting the signal and opening of the gates. During this waiting period certain of the horses being more temperamental than others become restless and move about in the stalls to the annoyance of other riders in adjacent stalls and to the discomfiture of the rider on the agitated animal making it necessary for him to direct his attention to and in most cases, futile attempts to quiet the animal.

It has been found that a horse of restless nature may be restrained by attaching one end of a line or tether to the head of the animal and the other end to a post or other fixture.

In accordance with the present invention means are provided to control the horse against erratic movement during the waiting period in a stall. This is attained by utilizing the gates when in closed relation to serve as a hitching post to which the horse is tethered during the waiting period prior to the opening of the gates utilizing the opening of the gates to release the horse for passage therethrough.

An object of the invention is to provide a starting gate including a stall and in utilizing the gate as a hitching post for a horse within the stall when the gate is closed and in providing means whereby the initial movement of the gate to open position serves to release the horse.

Another object of the invention is to provide the gates of a stall with a latch to secure one end of a line attached to a horse and for actuating the latch to release the horse upon the initial movement of the gates to open positions.

A further object of the invention is to provide the gates of a stall with means for securing a line attached to a horse within the stall, releasing the line as the gates are opened and utilizing one of the gates to remove the line.

Other objects and advantages of the invention will be more clearly understood from the following specification together with the accompanying drawing in which:

FIG. 1 is a front elevational view of a starting gate showing the gates of a stall in which a horse and rider await the opening of the gates;

FIG. 2 is a side view partly in section on line 2—2 of FIG. 1 showing the head of a horse and the bridle with a nose strap and ring with a line or tether when passed through the ring and attached to the gates of a stall;

FIG. 3 is an enlarged fragmentary front view of the posts of the gates when closed and showing the ends of a line or tether attached to the posts for hitching a horse to the gates before the gates are opened, and FIG. 4 is a cross sectional view taken on line 4—4 in FIG. 3 and showing in dotted lines the gates in spaced relation releasing one end of a line or tether.

As shown in the drawing, the present invention is illustrated as applied to a starting gate 10 of the same general type as employed at race tracks and including a plurality of stalls 11 in which the horses are retained ready for the starting of the race, each stall being provided with a pair of gates.

Referring to the drawing (FIG. 1) the stall 11 includes gates 12 and 13 hingedly mounted on posts 14 and 15 respectively. In accordance with common practice, the gates when closed, to retain the horses ready for the race, are upon a given signal opened automatically to release the horses for the starting of the race. Starting gate systems of this type are in extensive use at race tracks and the present invention is applicable to any of the well known starting gate systems. As will also be evident the invention may be used where swinging gates are employed whether the gates are opened by automatic means or are manually operated.

As shown in one practical application of the invention the gate 12 includes a frame having what may be termed an edge rod 16 at the free end of the frame of the gate 12. The frame of gate 13 has an edge rod 17 at its free end. When the gates are closed the rods 16 and 17 are in adjacent relation as shown in FIG. 1.

It has been found, as above mentioned, that when a horse, subject to erratic movement while waiting in a stall, is tethered the animal remains relatively calm and under control of the rider. When it is found necessary to keep a horse under control of a rider 20', the horse is provided with a bridle 18 (see FIG. 2) including a nose band 19 on the underside of which is secured a ring 21 which may be of metal. When the horse is in the stall a line or tether 22 is passed through the ring 21 and one end of the line is attached to one of the gates and the other end of the line is attached to the other gate.

The line or tether 22 may be, as shown, an endless strand doubled so as to pass through ring 21 and provide end portions in the form of loops 23 and 24 which are attached to means on the gate to retain the horse in a quiet state during the wait when the gates are closed and to automatically release the horse when the gates are opened as will be hereinafter described and explained.

Referring to FIGS. 3 and 4 it will be noted that a semi-cylindrical member 25, of greater diameter than the edge rods, is secured to edge rod 16 of gate 12 by means of set screws 26. Extending from member 25 is a forked member 27 having tines 28 and 29 (see FIG. 3). A similar semi-cylindrical member 31 is secured to edge rod 17 of gate 13 by means of set screws 32 and extending from member 31 is a forked member 33 having tines 34 and 35. The members 25 and 31 may vary in construction and may be termed gripping members to be applied or removed.

At the free end of forked member 33 is a pin 36 extending between tines 34 and 35 thereof on which a U-shaped member 37 is hingedly and eccentrically mounted. Forked member 27 is also provided with a pin 38 extending between tines 28 and 29 thereof and so arranged as to be received between arms 39 and 40 of U-shaped member 37 when the gates are in closed relation. Secured to semi-cylindrical member 25 is a snap hook 41.

When a horse and rider are in a stall loop 24 of tether 22 is engaged by snap hook 41 and the double strand or tether is passed through ring 21. The edge rods 16 and 17 of the gates are moved to close relation to permit loop 23 of the tether to pass over and be engaged by arm 39 of the U-shaped member 37. The gates are then moved to closed positions and pin 38 of forked member 27 is disposed between arms 39 and 40 of member 37 thus temporarily securing the loop 23 against removal. The U-shaped member 37 in cooperation with the pin 38 of forked member 27 provides what may be termed a latch. The horse in the stall is by means of the tether restrained and as has been found does not move about in a manner annoying to the rider or other contestants.

From the above it will be evident that the loop 24 of the line or tether 22 is held in fixed relation to the gate 12. The other loop 23 is disposed about the arm 39 of the U-shaped member 37 which is in contact with pin 38 of forked member 27 whereby the horse is tethered while the gates are closed.

When the gates are opened the U-shaped member 37 is moved out from engagement with pin 38 and rotates about pin 36 to open the latch and release the loop 23. Loop 24, however, is held in fixed relation to gate 12 by reason of snap hook 41. The gates open at relatively high speed and their initial movement results in the instantaneous actuation of the latch to release loop 23. The rapid movement of gate 12, which is secured to the tether by loop 24 results in the removal of the tether from the ring 21 as the gates are opened and leaving the horse free for passage through the gates.

As shown, the present device includes means comprising semi-cylindrical members for attachment to the edge posts of the gates, which members may be applied or removed. It is to be understood that the edge posts of the gates may be provided with permanent means for accomplishing the results attained. Although the tether as shown is in the form of an endless strand to provide loops a single line may be used provided with end loops.

Although a preferred embodiment of the invention is shown and described herein it is to be understood that modifications may be made therein without departing from the spirit and scope of the invention as set forth in the appended claims.

What is claimed is:

1. In combination with a starting gate including a stall having a pair of swinging gates to retain a horse within the stall when the gates are closed, a device for restraining erratic movements of a horse within said stall prior to the opening of the gates comprising a ring attached to the head harness of the horse, a flexible line extending through said ring, a loop at one end of said line, means on one of said gates to engage said loop, a second loop at the other end of said line, a pivoted member on one of said gates for engaging said second loop, means on the other of said gates to engage said pivoted member to prevent erratic head movement of the horse when the gates are closed, movement of said gates releasing said second loop from said pivoted member when the gates are opened, the gate having the first mentioned loop attached thereto serving when moved to open position to withdraw the line from said ring.

2. A starting gate for horses including a stall having a pair of swinging gates, the free edge of one of said gates having a rigid arm extending therefrom, a U-shaped member pivotally mounted on said arm, the free edge of the other of said gates having a rigid arm extending therefrom, and having a pin at the free end thereof for disposition between the arms of said U-shaped member, means for attaching a ring to the head of a horse positioned in said stall, a line extending through said ring, said line having a loop at each end thereof, and having one of said loops disposed about an arm of said U-shaped member when said gates are in closed relation, means for securing the other of said loops to one of said gates to tether said horse, said U-shaped member being movable to release the loop from the arm thereof to release said horse when said gates are opened.

3. A starting gate for horses including a stall having a pair of swinging gates, the free edge of one of said gates having a rigid arm extending therefrom, a U-shaped member pivotally mounted on said arm, the free edge of the other of said gates having a rigid arm extending therefrom, and having a pin at the free end thereof for disposition between the arms of said U-shaped member, means for attaching a ring to the head of a horse positioned in said stall, a line extending through said ring, said line having a loop at each end thereof, and having one of said loops disposed about an arm of said U-shaped member when said gates are in closed relation, means for securing the other of said loops to one of said gates to tether said horse, said U-shaped member being movable to release the loop from the arm thereof to release said horse when said gates are opened, said gate having said loop secured thereto serving to remove said line from said ring upon the opening of said gates.

4. A device for tethering a horse in a stall having a pair of hingedly mounted gates, comprising a pair of gripping members, means for securing one of said members to the free edge of each of said gates, an arm extending from each of said members, one of said arms having a U-shaped member hingedly attached thereto, the other of said arms having a pin disposed between the arms of said U-shaped member when said gates are in closed relation, one of the arms of said U-shaped member engaging a line to tether a horse in said stall and movable to release said line when said pin is moved from between the arms of said U-shaped member when said gates are in open relation.

5. A device for tethering a horse in a stall having a pair of hingedly mounted gates, comprising a pair of semi-tubular members, means for securing one of said members to the free edge of each of said gates, a forked arm extending from each of said tubular members, one of said arms having a U-shaped member hingedly attached to a tine thereof, the other of said forked arms having a pin disposed between the arms of said U-shaped member when said gates are in closed relation, one arm of said U-shaped member engaging a line to tether a horse in said stall and to release said line when said forked arms are separated to release said U-shaped member when said gates are in open relation.

References Cited in the file of this patent

UNITED STATES PATENTS

| 674,975 | Monlezun | May 28, 1901 |
| 2,165,937 | Nancarrow | July 11, 1939 |
| 2,808,026 | Georgette et al. | Oct. 1, 1957 |
| 2,985,138 | Fortin | May 23, 1961 |

FOREIGN PATENTS

| 23,823 | Austria | Apr. 10, 1906 |